US012746473B2

(12) United States Patent
Haefliger

(10) Patent No.: US 12,746,473 B2
(45) Date of Patent: Sep. 29, 2026

(54) SYSTEM, GAME DEVICE, METHOD, AND PROGRAM FOR DETERMINING MOTION SEQUENCE

(71) Applicant: CYGAMES, INC., Tokyo (JP)

(72) Inventor: Adan Haefliger, Tokyo (JP)

(73) Assignee: CYGAMES, INC., Tokyo (JP)

( * ) Notice: Subject to any disclaimer, the term of this patent is extended or adjusted under 35 U.S.C. 154(b) by 196 days.

(21) Appl. No.: 18/672,701

(22) Filed: May 23, 2024

(65) Prior Publication Data

US 2024/0307781 A1 Sep. 19, 2024

Related U.S. Application Data

(63) Continuation of application No. PCT/JP2022/042874, filed on Nov. 18, 2022.

(30) Foreign Application Priority Data

Nov. 26, 2021 (JP) ................................ 2021-192288

(51) Int. Cl.
*A63F 13/56* (2014.01)
*A63F 13/52* (2014.01)
*A63F 13/58* (2014.01)

(52) U.S. Cl.
CPC .............. *A63F 13/56* (2014.09); *A63F 13/52* (2014.09); *A63F 13/58* (2014.09)

(58) Field of Classification Search
None
See application file for complete search history.

(56) References Cited

U.S. PATENT DOCUMENTS

2009/0085864 A1* 4/2009 Kutliroff ................. A63F 13/10 463/40
2014/0004950 A1* 1/2014 Szufnara ................. A63F 13/52 463/43

(Continued)

FOREIGN PATENT DOCUMENTS

JP 6549301 B1 7/2019

OTHER PUBLICATIONS

S. Clavet, "Motion matching and the road to next-gen animation" in Proc. of GDC, Jul. 2016. (107 pages).

(Continued)

*Primary Examiner* — Jason T Yen
(74) *Attorney, Agent, or Firm* — Osha Bergman Watanabe & Burton LLP

(57) ABSTRACT

One or more embodiments of the invention is a system for determining a motion sequence of a virtual object, the system including: a motion database that stores each of a plurality of motion sequences in association with sub-features of a plurality of types, each of the sub-features of the plurality of types associated with said each motion sequence being a feature related to said motion sequence; a sub-feature extraction unit that extracts a sub-feature(s) of a predetermined type(s) from features related to the virtual object; and a motion-sequence determination unit that determines one motion sequence from the motion database by comparing each of the sub-feature(s) of the predetermined type(s) extracted by the sub-feature extraction unit with each of sub-feature(s) of the predetermined type(s) in the individual motion sequences stored in the motion database.

9 Claims, 4 Drawing Sheets

(56) References Cited

U.S. PATENT DOCUMENTS

| | | | | |
|---|---|---|---|---|
| 2020/0234481 | A1* | 7/2020 | Scapel | G06T 13/40 |
| 2021/0322881 | A1 | 10/2021 | Tago et al. | |

OTHER PUBLICATIONS

J. Choi et al. "Generating a Ball Sport Scene in a Virtual Environment" KSII Transactions on Internet and Information Systems, vol. 13, No. 11; Nov. 2019 (15 pages).

* cited by examiner

SYSTEM, GAME DEVICE, METHOD, AND PROGRAM FOR DETERMINING MOTION SEQUENCE

TECHNICAL FIELD

The present invention relates to a system, a game device, a method, and a program for determining a motion sequence of a virtual object in a virtual space.

BACKGROUND ART

Motion matching (Non-Patent Literature 1) is a known technique for naturally moving a virtual character in a virtual space. Motion matching is brute-force (round-robin) motion synthesis for searching an enormous animation database for animation clips of a walking or running character that best fit the current situation. Motion matching is a straightforward technique for obtaining appropriate animation clips that fit the motion requirements, and the found motions can be blended into the animation that is being executed. Patent Literature 1 discloses a game as a game for moving a three-dimensional virtual character in a virtual space.

CITATION LIST

Patent Literature

[Patent Literature 1] Publication of Japanese Patent No. 6549301

Non-Patent Literature

[Non-Patent Literature 1] S. Clavet, "Motion matching and the road to next-gen animation," in Proc. of GDC, July 2016.

SUMMARY OF INVENTION

Technical Problem

Conventional motion matching has a problem in that it is difficult to deal with various contexts due to the necessity to change the whole feature vector when the context, such as a game situation, changes, for example. The present invention has been made to solve such a problem, and an object thereof is to provide a system etc. capable of realizing more flexible motion matching.

Solution to Problem

[1] According to one embodiment, the present invention provides a system for determining a motion sequence of a virtual object in a virtual space, the system comprising: a motion database that stores each of a plurality of motion sequences in association with sub-features of a plurality of types, each of the sub-features of the plurality of types associated with said each motion sequence being a feature related to said motion sequence; a sub-feature extraction unit that extracts a sub-feature(s) of a predetermined type(s) from features related to the virtual object; and a motion-sequence determination unit that determines one motion sequence from the motion database by comparing each of the sub-feature(s) of the predetermined type(s) extracted by the sub-feature extraction unit with each of sub-feature(s) of the predetermined type(s) in the individual motion sequences stored in the motion database.

[2] In the embodiment of the present invention, in the system according to [1], the sub-feature extraction unit extracts, from the features related to the virtual object, a sub-feature(s) of a predetermined type(s) according to the state of the virtual object.

[3] In the embodiment of the present invention, in the system according to [2], the state of the virtual object includes that the distance between the virtual object, which serves as a target for which a motion sequence is to be determined, and a predetermined other virtual object is within a predetermined range.

[4] In the embodiment of the present invention, in the system according to [2] or [3], the system is a game system for providing a game that is made to proceed, with the virtual object being disposed in the virtual space, and for determining a motion sequence of the virtual object in the game; and wherein the sub-feature extraction unit extracts, from the features related to the virtual object included in a game state generated by the system, a sub-feature(s) of a predetermined type(s) according to the state of the virtual object included in the game state generated by the system.

[5] In the embodiment of the present invention, in the system according to one of [1] to [4], the motion-sequence determination unit calculates, for each type of the sub-feature(s) extracted by the sub-feature extraction unit, the degrees of similarity between a sub-feature of one type and sub-features of said one type in the individual motion sequences stored in the motion database, and determines one motion sequence on the basis of the calculated degrees of similarity.

[6] In the embodiment of the present invention, in the system according to [5], the motion-sequence determination unit calculates, for each type of the sub-feature(s) extracted by the sub-feature extraction unit, the degrees of similarity by performing a nearest neighbor search.

[7] In the embodiment of the present invention, in the system according to one of [1] to [6], in the case where the degree of similarity between a sub-feature of one type extracted by the sub-feature extraction unit and a sub-feature of said one type in one motion sequence stored in the motion database does not satisfy a predetermined criterion, the motion-sequence determination unit determines a motion sequence other than said one motion sequence.

[8] According to one embodiment, the present invention provides a game device for providing a game that is made to proceed, with a virtual object being disposed in a virtual space, the game device comprising: a motion database that stores each of a plurality of motion sequences in association with sub-features of a plurality of types, each of the sub-features of the plurality of types associated with said each motion sequence being a feature related to said motion sequence; a sub-feature extraction unit that extracts a sub-feature(s) of a predetermined type(s) from features related to the virtual object; and a motion-sequence determination unit that determines one motion sequence from the motion database by comparing each of the sub-feature(s) of the predetermined type(s) extracted by the sub-feature extraction unit with each of sub-feature(s) of the predetermined type(s) in the individual motion sequences stored in the motion database.

[9] According to one embodiment, the present invention provides a method for determining a motion sequence of a virtual object in a virtual space, sub-features of a plurality of types being features related to one motion sequence, the method comprising: a step for extracting a sub-feature(s) of a predetermined type(s) from features related to the virtual object; and a step for determining one motion sequence from the motion database by comparing each of the extracted sub-feature(s) of the predetermined type(s) with each of sub-feature(s) of the predetermined type(s) in individual motion sequences stored in a motion database that stores each of the plurality of motion sequences in association with sub-features of a plurality of types.

According to one embodiment, the present invention provides a program causing a computer to execute the steps of the method according to [9].

Advantageous Effects of Invention

According to the present invention, more flexible motion matching can be realized.

DESCRIPTION OF EMBODIMENTS

An embodiment of the present invention will be described below with reference to the drawings. A game device 10 of the embodiment of the present invention provides a game (hereinafter, referred to as game A) that is made to proceed, with a virtual object such as a virtual character disposed in a virtual space. For example, in the game A, a user moves an operation-target virtual character via a controller. In this embodiment, the virtual space is a 3D space, and the virtual object is a 3D model. The virtual object such as a virtual character is composed of elements such as known bones and joints.

Although the game device 10 is one example of a game system configured to include one or a plurality of devices, the game device 10 will be described as one device in the following embodiment, for convenience of explanation.

Figure 1:
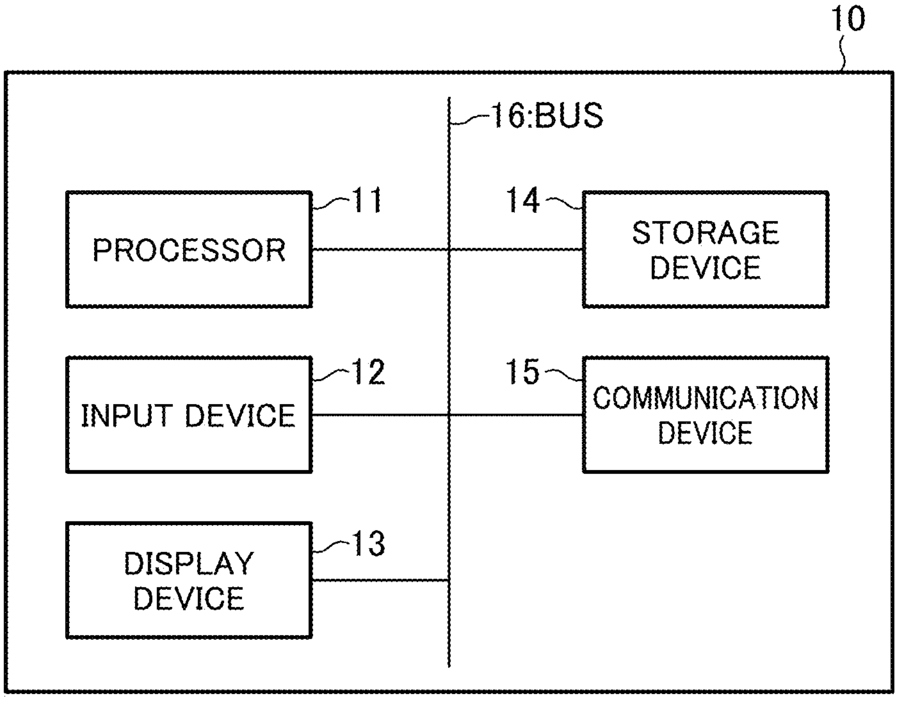
FIG. 1 is a block diagram showing the hardware configuration of a game device according to one embodiment of the present invention.

FIG. 1 is a block diagram showing the hardware configuration of the game device 10 according to the embodiment of the present invention. The game device 10 includes a processor 11, an input device 12, a display device 13, a storage device 14, and a communication device 15. These individual constituent devices are connected via a bus 16. Note that it is assumed that interfaces are interposed as needed between the bus 16 and the individual constituent devices. The game device 10 includes a configuration similar to those of general servers and PCs.

The processor 11 controls the overall operation of the game device 10. For example, the processor 11 is a CPU. The processor 11 executes various kinds of processing by loading programs and data stored in the storage device 14 and executing the programs. The processor 11 may be constituted of a plurality of processors.

The input device 12 is a user interface for accepting inputs to the game device 10 from the user and is, for example, a touch panel, a touchpad, a keyboard, a mouse, or a button. The display device 13 is a display for displaying application screens etc. to the user of the game device 10 under the control of the processor 11.

The storage device 14 includes a main storage device and an auxiliary storage device. The main storage device is, for example, a semiconductor memory such as a RAM. The RAM is a volatile storage medium that allows high-speed reading and writing of information and is used as a storage area and a work area when the processor 11 processes information. The main storage device may include a ROM, which is a read-only non-volatile storage medium. The auxiliary storage device stores various programs and data that is used by the processor 11 for executing the programs. The auxiliary storage device may be any type of non-volatile storage or non-volatile memory that is capable of storing information and may be detachable.

The communication device 15 is a module, a device, or an apparatus capable of sending data to and receiving data from another computer, such as a user terminal or a server, via a network. The communication device 15 can also be a device or a module for wireless communication or a device or a module for wired communication. In the case where the game device 10 does not perform communication with any other device the game device 10 need not include the communication device 15.

Figure 2:
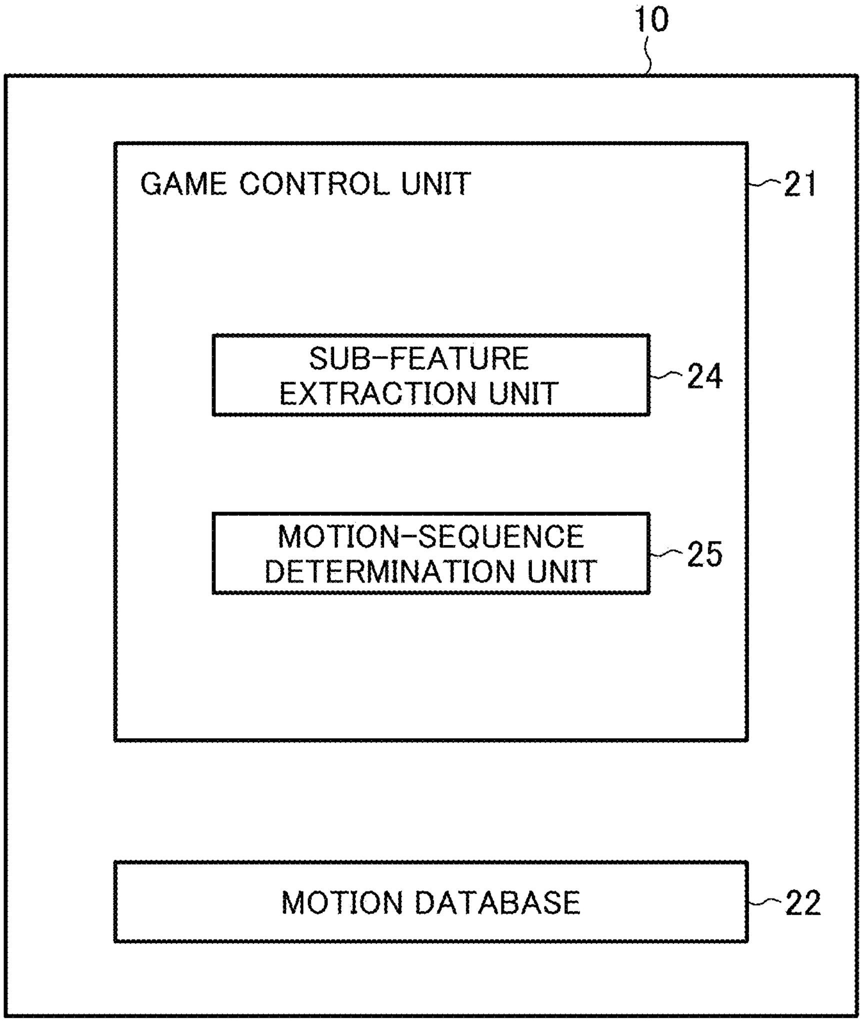
FIG. 2 is a functional block diagram of the game device according to the embodiment of the present invention.

FIG. 2 is a functional block diagram of the game device 10 according to the embodiment of the present invention. The game device 10 includes a game control unit 21 and a motion database 22 (hereinafter, referred to as "motion DB 22"). The game control unit 21 includes a sub-feature extraction unit 24 and a motion-sequence determination unit 25. In this embodiment, the functions thereof are realized when the processor 11 executes programs that are stored in the storage device 14 or that are received via the communication device 15. The motion DB 22 is realized, for example, when the storage device 14 stores database data (for example, a table) and a database program, and the program is executed. Since the various kinds of functions are realized by loading the programs, in this way, a portion or the entirety of one part (function) may be included in another part. Alternatively, these functions may be realized by means of hardware by configuring electronic circuits or the like each realizing a portion or the entirety of each of the functions.

The game control unit 21 performs basic control to realize the game A and can include functions provided in a known game program and a game server. The game control unit 21 generates (updates), for each predetermined processing time such as a frame rate, a game state including features related to the virtual character. The features related to the virtual character include, for example, features related to movement of the virtual character, such as the position and orientation of each bone that constitutes the virtual character, the relative distance thereof (to another bone), the velocity thereof, the acceleration thereof, the direction thereof, and the angular velocity thereof. For example, the game control unit 21 calculates information related to movement of the virtual character in an updated game state, on the basis of the features related to movement of the virtual character in the current game state and operation information from the user who plays the game A. Furthermore, the features related to the virtual character include information about the state of the virtual character, such as the relative distance between a predetermined bone that constitutes the virtual character and a predetermined point in a virtual object that is different from the virtual character or whether they are in contact or not. Information about the position, the velocity, the acceleration, the direction, etc. included in the features related to the virtual character just needs to allow the game to be operated and can be relative information (for example, relative position, relative velocity, relative acceleration, and relative direction) from a predetermined reference point or reference coordinates.

Figure 3:
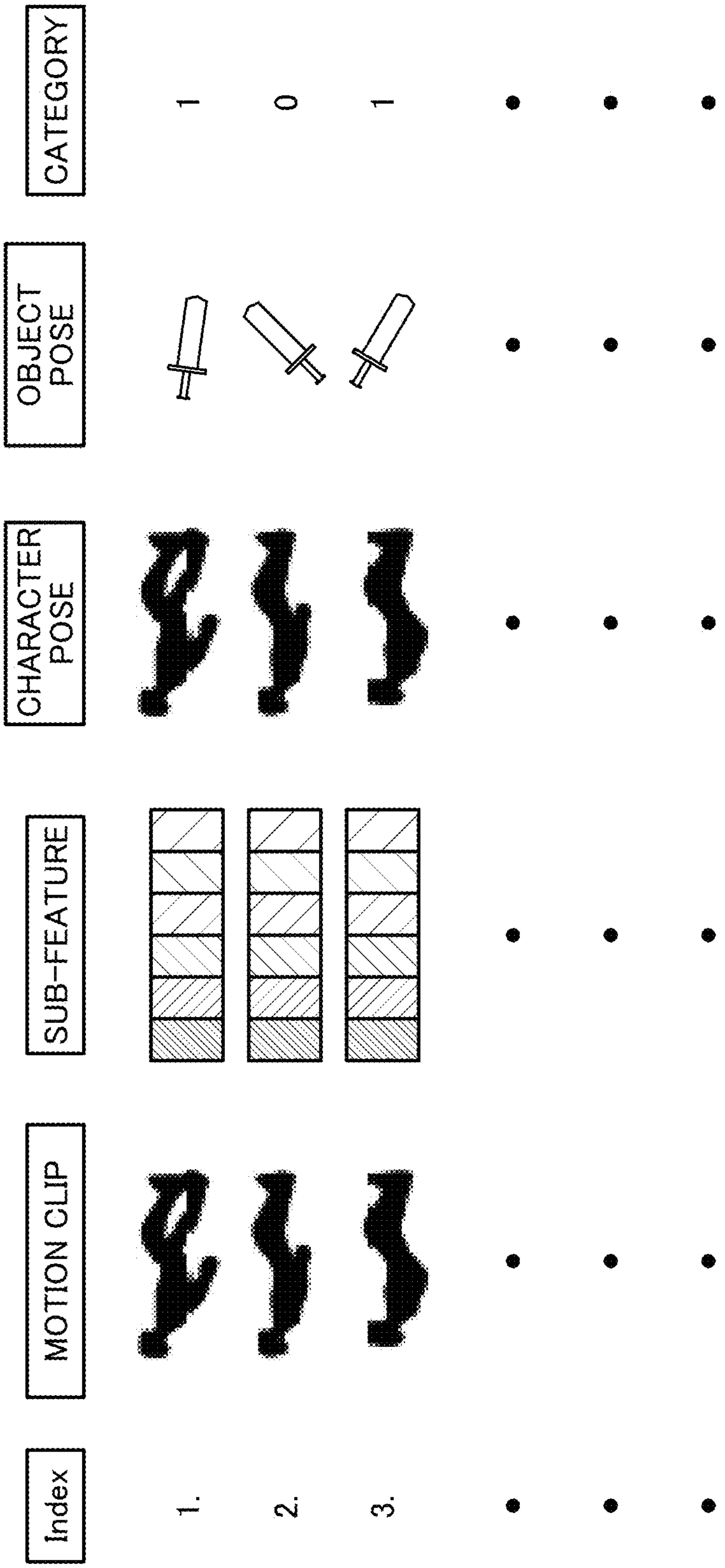
FIG. 3 is a view showing an example of a data structure of a motion DB.

FIG. 3 is a view showing an example of a data structure of the motion DB 22. The motion DB 22 stores a plurality of motion sequences (motion clips) extracted for individual frames (time frames), by a known method, from a series of motion sequences (entire motion sequence or animation) of a character that are obtained in advance. In this embodiment, the individual motion sequences (motion clips) are stored in the motion DB 22 in chronological order in association with indexes. In this case, when the motion sequences are connected in the index order, the original series of motion sequences (animation) of the character is obtained. One frame corresponds to a predetermined time period (time frame), for example, two seconds. In this embodiment, although individual frames have the same predetermined time period, the present invention is not limited thereto. Note that the data structure of the motion DB 22 is one example, and the present invention is not limited thereto. For example, an index for identifying each motion sequence is one example.

The motion DB 22 stores a character pose, obtained from one motion sequence, at a fixed timing in the frame of this motion sequence, in association with the index associated with this motion sequence. In one example, a character pose at a fixed timing in the frame is a character pose at the start or the end of the frame. The character pose includes position-orientation information (position information and rotation information) of each bone that constitutes the virtual character.

If the character is accompanied by an accompanying object, motion sequences of the character include the accompanying object. The motion sequences of the virtual character stored in the motion DB 22 of FIG. 3 include, as an accompanying object (virtual object), a sword object held by the character, as shown in the figure. The motion DB 22 stores an object pose, obtained from one motion sequence, at a fixed timing in the frame of this motion sequence, in association with the index associated with this motion sequence. The object pose includes similar information to the character pose, at the same timing as the character pose. A portion or the whole of the character motion sequences may include no accompanying objects or may include a plurality of accompanying objects (for example, a sword and a shield held by the character). The motion DB 22 can store an accompanying object(s) in association with an index (es), according to the number of accompanying objects.

The motion DB 22 can also store information necessary for operating a 3D model, obtained from a motion sequence by a known method, in association with the index associated with this motion sequence.

The motion DB 22 stores the action category of each motion sequence in association with the index associated with the corresponding motion sequence. In this embodiment, although the category is one of 0 to 2, where "0" indicates the state of not moving, "1" indicates the state of walking, and "2" indicates the state of running, the present invention is not limited thereto. For example, a series of motion sequences of a character are obtained in advance, and, when each of the motion sequences is stored in the motion DB 22 in chronological order, the category corresponding to the motion sequence is also stored.

The motion DB 22 stores sub-features of a plurality of types related to one motion sequence, in association with the index associated with this motion sequence. Sub-features are information correlated with the state of the motion sequence at that time. In one example, a sub-feature of one type is one or some of features related to movement of the virtual character. In this case, for example, a sub-feature of one type is information related to a bone in a predetermined section among the bones constituting the virtual character. A bone in a predetermined section is one or a plurality of bones in the predetermined section, and can be, for example, a bone(s) in the right toe, a bone(s) in the right knee, or a bone(s) in the right elbow. For example, in this case, each of the bone(s) in the right toe, the bone(s) in the right knee, and the bone(s) in the right elbow corresponds to a sub-feature(s) of one type. For example, information related to a bone(s) in a predetermined section includes the relative distance of the bone(s) in the predetermined section, the relative velocity of the bone(s) in the predetermined section, the relative acceleration of the bone(s) in the predetermined section, the relative direction of the bone(s) in the predetermined section, the angular velocity of the bone(s) in the predetermined section, and the distance between the bone(s) in the predetermined section and a predetermined point. In one example, a sub-feature of one type is one of items of information on the state of the virtual character. In this case, for example, a sub-feature of one type is information related to the distance between a virtual character and a predetermined virtual object such as a chair, a wall, or the ground or related to whether they are in contact or not. In one example, a sub-feature of one type is the action category of a motion sequence.

The sub-feature extraction unit 24 extracts a sub-feature(s) of a predetermined type(s) from the features related to the virtual character. In this embodiment, the sub-feature extraction unit 24 extracts a sub-feature(s) of a predetermined type(s) according to the state of the virtual character, from the features related to the virtual character included in the game state generated by the game control unit 21. With this configuration, the sub-feature extracting unit 24 can extract a sub-feature(s) according to the context of the proceeding game.

In one example, the sub-feature extraction unit 24 extracts, from the features related to the virtual character, a sub-feature(s) of a predetermined type(s) according to the distance between the virtual character and another virtual object such as a chair object or a wall object. In this case, the sub-feature extraction unit 24 is configured to extract a sub-feature(s) of a different type(s) according to the distance between the virtual character and another virtual object. In one example, the sub-feature extraction unit 24 extracts, from the features related to the virtual character, a sub-feature(s) of a predetermined type(s) according to the posture of the virtual character, e.g., a posture in which the right foot of the virtual character is on the ground and in which the left foot thereof is in the air.

The motion-sequence determination unit 25 compares each of the sub-feature(s) of the predetermined type(s) extracted by the sub-feature extraction unit 24 with each of sub-feature(s) of the predetermined type(s) in the individual motion sequences stored in the motion DB 22, thereby determining one motion sequence from the motion DB 22.

The game control unit 21 synthesizes the determined motion sequences to generate an animation (motion) of the virtual character. In this embodiment, except for the motion-sequence determination method used by the sub-feature extraction unit 24 and the motion-sequence determination unit 25, a known motion matching technique can be applied to generate the animation of the virtual character. In one example, the sub-feature extraction unit 24 extracts a sub-feature(s) of a predetermined type(s) from the current game state, and the motion-sequence determination unit 25 determines a motion sequence to be used by the game control unit 21 for generating the next game state.

In this embodiment, the motion-sequence determination unit 25 calculates, for each type of sub-feature(s) extracted by the sub-feature extraction unit 24, the degrees of similarity between a sub-feature of one type and sub-features of said one type in the individual motion sequences stored in the motion DB 22, and determines one motion sequence on the basis of the calculated degrees of similarity.

In one example, the sub-feature extraction unit 24 extracts three sub-features SF-1, SF-2, and SF-3 from the features related to the virtual character in the current game state. The motion-sequence determination unit 25 calculates the degrees of similarity between the extracted SF-1 and sub-features of the same type as SF-1 that are associated with the individual indexes in the motion DB 22. In this way, the motion-sequence determination unit 25 calculates, for the type of extracted sub-feature SF-1, the degrees of similarity with said extracted sub-features in all motion sequences (all indexes) in the motion DB 22. Similarly, the motion-sequence determination unit 25 calculates, for each of the types of extracted sub-features SF-2 and SF-3, the degrees of similarity with said extracted sub-features in all motion sequences in the motion DB 22. The motion-sequence determination unit 25 determines one motion sequence on the basis of the degrees of similarity for SF-1, SF-2, and SF-3 calculated for all motion sequences in the motion DB 22. The number of sub-features (types of sub-features) to be extracted by the sub-feature extraction unit 24 is not limited to the above-described example.

In one example, the motion-sequence determination unit 25 calculates, for each type of sub-feature extracted by the sub-feature extraction unit 24, the distances between the extracted sub-feature and sub-features of the same type as the extracted sub-feature, associated with the individual indexes in the motion DB 22, by executing a nearest neighbor search, and determines the degrees of similarity corresponding to the calculated distances.

In one implementation example, the motion-sequence determination unit 25 uses Euclidean distance as a distance function when calculating the degrees of similarity for the individual sub-features of the relative distance, the relative velocity, and the relative acceleration of a bone(s) in a predetermined section. For example, for the velocity, the motion-sequence determination unit 25 encodes the rotation θ about the v-axis into a quaternion, $$q_n = \left(\cos\frac{\theta}{2},\ \sin\frac{\theta}{2}v\right)^T$$

and calculates the angle between two quaternions by using the quaternion distance ($d_Q$) in Equation (1), to calculate the degree of similarity.

$$d_Q(q_1, q_2) = 2\cos^{-1}(|\langle q_1, q_2\rangle|) \tag{1}$$

In this embodiment, since the degrees of similarity between the type(s) of sub-features calculated by the motion-sequence determination unit 25 have different scales, the motion-sequence determination unit 25 calculates similarity scores by normalizing the values of the calculated degrees of similarity or by making the values of the calculated degrees of similarity into scores by a predetermined method. In one example, the motion-sequence determination unit 25 calculates similarity scores in all indexes (all motion sequences) in the motion DB 22, for each type of sub-feature extracted by the sub-feature extraction unit 24, and determines one index (motion sequence) on the basis of the sum of similarity scores of sub-features of a plurality of types (for example, the sum of similarity scores of SF-1 to SF-3) in each index.

In one example, in the case where the degree of similarity between a sub-feature of one type extracted by the sub-feature extraction unit 24 and a sub-feature of said one type in one motion sequence stored in the motion DB 22 does not satisfy a predetermined criterion, the motion-sequence determination unit 25 determines a motion sequence other than the motion sequence that does not satisfy the predetermined criterion. With this configuration, the motion-sequence determination unit 25 can exclude a motion sequence that does not satisfy a criterion for a sub-feature of one type for which a positional shift of a certain amount or more is unacceptable, irrespective of the magnitudes of the degrees of similarity for sub-features of the other types.

In one implementation example, the motion-sequence determination unit 25 determines a motion sequence using an argmin function shown in Equation (5). Here, D is all motion sequences stored in the motion DB 22, $n_j$ is the acceptance percentile, and $dist_j$ is the j-th considered sub-feature (distance function). The motion-sequence determination unit 25 obtains, from the motion DB 22 and as a sub-feature vector, a sub-feature corresponding to a sub-feature extracted by the sub-feature extraction unit 24.

$$F_j \in \mathbb{R}^{|D| * d_j}$$

Here, $d_j$ is the magnitude of the j-th sub-feature vector. The sub-feature extraction unit 24 extracts a sub-feature vector $$F_j^{state} \in \mathbb{R}^{d_j}$$

from the current game state generated by the game control unit 21, and the motion-sequence determination unit 25 concatenates this sub-feature vector D times according to the magnitude of $F_j$ and uses Equation (2) and the corresponding sub-feature (distance function) to calculate a score (similarity score), shown in Equation (3), in each index in the motion DB 22.

$$S_j = \left(F_j^{state},\ F_j\right) \tag{2}$$

$$S_j \in \mathbb{R}^{|D|} \tag{3}$$

The acceptance percentile $n_j$ represents the threshold for the j-th sub-feature (type of sub-feature) and is used to select valid motion sequences (indexes) in Equation (4).

$$I = \bowtie(I_1, I_2, \ldots\ )\quad I_j = \left\{i \,\middle|\, S_{j_i} < \eta_j,\ \forall\, i \in |D|\right\} \tag{4}$$

The motion sequence determining unit 25 calculates the normalized scores using Equations (2) to (4), etc., and obtains the motion sequence (index) with the lowest score using Equation (5).

$$\operatorname{argmin}_i\left(\sum_j \frac{S_j}{\tilde{S}_J}\right), i \in I \quad (5)$$

Here,
$\tilde{S}_J$
is the median of $S_j$.

In the above implementation example, in the case where there is no valid index in Equation (4), the motion-sequence determination unit 25 outputs an index with the lowest score and registers or emits a miss event indicating either that the selected threshold is too strict or that more data is necessary. With respect to this, since the motion-sequence determination unit 25 uses the acceptance percentile $n_j$ as an adaptive threshold to forcibly output a motion sequence with a score less than a certain percentile, effective motion matching becomes possible. Furthermore, in the case where scores of a plurality of sub-features are combined, scores with smaller absolute values have less influence on the total score. Since median scaling in Equation (5) automatically adjusts the importance of sub-features, effective motion matching becomes possible.

Figure 4:
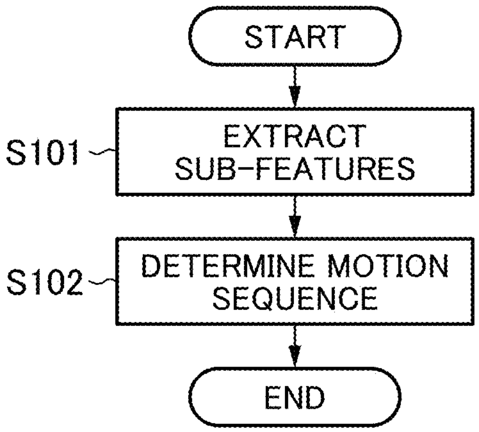
FIG. 4 is a flowchart showing processing at the game device according to the embodiment of the present invention

Next, processing in the game device 10 according to the embodiment of the present invention will be described below using a flowchart shown in FIG. 4.

In Step 101, the sub-feature extraction unit 24 extracts sub-features of predetermined types from the features related to the virtual object. In Step 102, the motion-sequence determination unit 25 compares each of the sub-features of the predetermined types extracted in Step 101 with each of sub-features of the predetermined types in the individual motion sequences stored in the motion DB 22, thereby determining one motion sequence from the motion DB 22.

Figure 5:
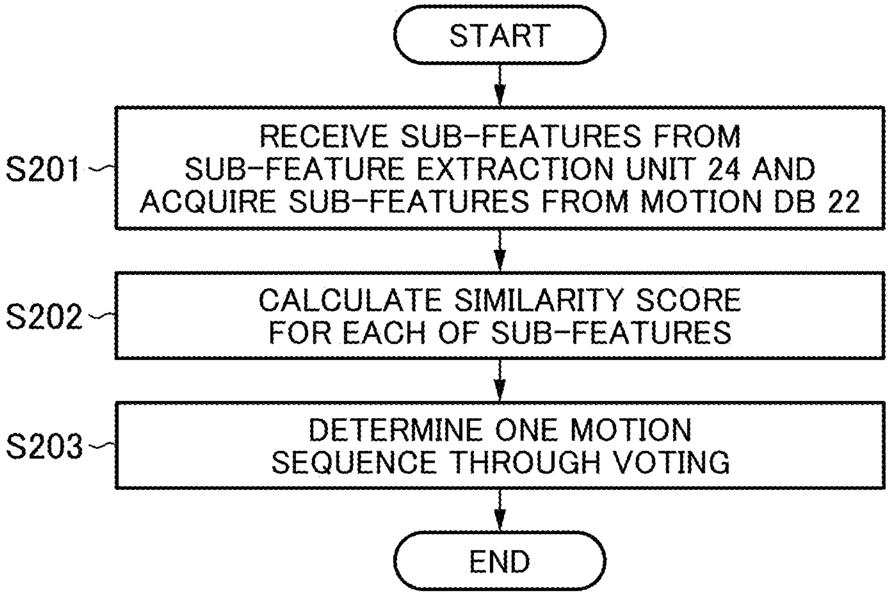
FIG. 5 is a flowchart showing an example of processing in Step 102 of FIG. 4.

Next, an example of the processing in Step 102 of FIG. 4 will be described using a flowchart shown in FIG. 5.

In Step 201, the motion-sequence determination unit 25 receives a plurality of sub-features extracted from the current game state by the sub-feature extraction unit 24, and acquires, from the motion DB 22, sub-features corresponding to the types of the plurality of sub-features extracted by the sub-feature extraction unit 24. In Step 202, the motion-sequence determination unit 25 calculates, for each index, similarity scores of the individual types of the plurality of sub-features. In Step 203, the motion-sequence determination unit 25 ranks (votes) each index by using the similarity scores, thereby determining one index, that is, the motion sequence associated with this index.

In Step 202, a plurality of similarity scores are calculated for each index. In one example, in Step 203, the motion-sequence determination unit 25 calculates an average value of the plurality of similarity scores for each index, determines one index on the basis of the calculated average value, and determines the motion sequence associated with this index. For example, in this case, the motion-sequence determination unit 25 determines the motion sequence associated with the index with the highest average value.

In one example, in Step 203, in the case where sub-features of predetermined types extracted by the sub-feature extraction unit 24 include predetermined-criterion determination target sub-features that are set in advance, the motion-sequence determination unit 25 determines whether the similarity scores of the predetermined-criterion determination target sub-features in each index are equal to or higher than a preset threshold, and extracts indexes having similarity scores equal to or higher than the threshold. The motion-sequence determination unit 25 calculates the average value of the plurality of similarity scores for each of the extracted indexes, determines one index on the basis of the calculated average value, and determines the motion sequence associated with this index. For example, in this case, the motion-sequence determination unit 25 determines the motion sequence associated with the index with the highest average value.

In one example, in Step 203, the motion-sequence determination unit 25 ranks, for each of the types of sub-features, the indexes by using the similarity scores. Accordingly, a plurality of ranks are given to each index. The motion-sequence determination unit 25 calculates the average value of the ranks for each index, and determines the motion sequence associated with one index on the basis of the average value. In this case, for example, the motion-sequence determination unit 25 determines the motion sequence associated with the index with the lowest average value.

In one example, in Step 203, in the case where sub-features of predetermined types extracted by the sub-feature extraction unit 24 include predetermined-criterion determination target sub-features that are set in advance, the motion-sequence determination unit 25 determines whether the similarity scores of the predetermined-criterion determination target sub-features in each index are equal to or higher than a preset threshold, and extracts indexes having similarity scores equal to or higher than the threshold. The motion-sequence determination unit 25 ranks the extracted indexes by using the similarity scores for each of the types of the sub-features, calculates the average value of the ranks for each index, and determines the motion sequence associated with one index on the basis of the average value. In this case, for example, the motion-sequence determination unit 25 determines the motion sequence associated with the index with the lowest average value.

Next, the main advantageous effects of the game device 10 according to the embodiment of the present invention will be described below. The game device 10 of the present embodiment includes the sub-feature extraction unit 24 and the motion-sequence determination unit 25 in order to generate animation of a virtual character through motion matching, and includes processing for handling sub-features, unlike conventional motion matching techniques.

In this way, sub-features to be extracted are selected according to the game state (context), such as the state of a virtual character, for example, and one motion sequence is determined on the basis of the degrees of similarity for the sub-features extracted in this way, whereby it is possible to control motion matching according to the situation.

Accordingly, more flexible motion matching can be realized. For example, in conventional motion matching, it is necessary to switch a motion matching controller when the context changes, such as when a character who has left a chair approaches the chair. In contrast to this, in this embodiment, it is only necessary to enable or disable a sub-feature (type of a sub-feature) "the distance to a chair", for example.

Furthermore, by performing matching that is limited to a sub-feature(s) according to the context, it becomes possible to play back more natural motion or animation. Accordingly, more flexible motion matching can be realized. Furthermore, in this embodiment, it is possible to realize such control according to the situation and playback of more natural motion, without incurring deterioration in performance compared with conventional motion matching.

The above-described advantageous effects are the same in other embodiments and modifications unless otherwise specified.

In another embodiment of the present invention, it is possible to provide a program for realizing the functions and the information processing shown in the flowcharts in the above-described embodiment of the present invention and a computer-readable storage medium that has stored the program. Furthermore, in still another embodiment, it is possible to provide a method for realizing the functions and the information processing shown in the flowcharts in the above-described embodiment of the present invention. Furthermore, in still another embodiment, it is possible to provide a server that can supply, to a computer, a program for realizing the functions and the information processing shown in the flowcharts in the above-described embodiment of the present invention. Furthermore, in still another embodiment, it is possible to provide a virtual machine or a cloud system that realizes the functions and the information processing shown in the flowcharts in the above-described embodiment of the present invention.

In one or a plurality of embodiments of the present invention, it is also possible to provide a game device, a game system, or the like that includes only the sub-feature extraction unit 24 and the motion sequence determination unit 25 and that is configured to be able to communicate with a known game program or a game server.

In one or a plurality of embodiments of the present invention, in the case where the game device 10 is a game system configured to include a plurality of devices, the game system can include: a client terminal such as a smartphone that accepts an input from the user; and a server device such as a game server that performs communication with a client terminal and that has the functions of the game control unit 21 and the motion DB 22.

In one or a plurality of embodiments of the present invention, the game device 10 can be a device or a system that provides, instead of the game A, a predetermined application that is made to proceed, with a virtual object such as a virtual character disposed in a virtual space, or can be a device or a system that provides the predetermined application, the device or the system determining a motion sequence of the virtual object.

In one or a plurality of embodiments of the present invention, the virtual character to be manipulated can be any virtual object, such as a vehicle, other than a character.

The processing or operation described above can be modified freely as long as no inconsistency arises in the processing or operation, such as an inconsistency that a certain step utilizes data that may not yet be available in that step. Furthermore, the examples described above are examples for explaining the present invention, and the present invention is not limited to those examples. The present invention can be embodied in various forms as long as there is no departure from the gist thereof.

REFERENCE SIGNS LIST

10 game device
11 processor
12 input device
13 display device
14 storage device
15 communication device
16 bus
21 game control unit
22 motion database
24 sub-feature extraction unit
25 motion-sequence determination unit

The invention claimed is:

1. A system for determining a motion sequence of a virtual object in a virtual space, the system comprising:

a motion database that stores each of a plurality of motion sequences in association with a plurality of sub-features of a plurality of types, each of the plurality of sub-features of the plurality of types associated with a respective motion sequence among the plurality of motion sequences being a feature related to the respective motion sequence;

a sub-feature extraction unit that extracts a sub-feature(s) of a predetermined type(s) from a plurality of features related to the virtual object; and a motion-sequence determination unit that determines one motion sequence from the motion database by comparing each of the sub-feature(s) of the predetermined type(s) extracted by the sub-feature extraction unit with the plurality of sub-features of the plurality of types in the plurality of motion sequences stored in the motion database, wherein the motion-sequence determination unit calculates, for each type of the sub-feature(s) extracted by the sub-feature extraction unit, a degree of similarity between a sub-feature of a predetermined type and sub-features of the predetermined type in the plurality of motion sequences stored in the motion database to produce a plurality of calculated degrees of similarities, and wherein the motion-sequence determination unit determines one motion sequence based on the plurality of calculated degrees of similarities.

2. The system according to claim 1, wherein the sub-feature extraction unit extracts, from the plurality of features related to the virtual object, the sub-feature(s) of the predetermined type(s) according to a state of the virtual object.

3. The system according to claim 2, wherein the state of the virtual object corresponds to whether a distance between the virtual object, which serves as a target for which a motion sequence is to be determined, and a predetermined other virtual object is within a predetermined range.

4. The system according to claim 2, wherein the system is a game system for providing a game that is made to proceed, with the virtual object being disposed in the virtual space, and for determining a motion sequence of the virtual object in the game; and wherein the sub-feature extraction unit extracts, from the plurality of features related to the virtual object included in a game state that is generated by the system, the sub-feature(s) of the predetermined type(s) according to the state of the virtual object included in the game state that is generated by the system.

5. The system according to claim 1, wherein the motion-sequence determination unit calculates, for each type of the sub-feature(s) extracted by the sub-feature extraction unit, the plurality of calculated degrees of similarity by performing a nearest neighbor search.

6. The system according to claim 1, wherein, in response to the degree of similarity between a sub-feature of the predetermined type extracted by the sub-feature extraction unit and a sub-feature of the predetermined type in one motion sequence stored in the motion database does not satisfy a predetermined criterion, the motion-sequence determination unit determines a motion sequence other than the motion sequence.

7. A game device for providing a game that is made to proceed, with a virtual object being disposed in a virtual space, the game device comprising:

a motion database that stores each of a plurality of motion sequences in association with a plurality of sub-features of a plurality of types, each of the plurality of sub-features of the plurality of types associated with a respective motion sequence among the plurality of motion sequences being a feature related to the respective motion sequence;

a sub-feature extraction unit that extracts a sub-feature(s) of a predetermined type(s) from a plurality of features related to the virtual object; and a motion-sequence determination unit that determines one motion sequence from the motion database by comparing each of the sub-feature(s) of the predetermined type(s) extracted by the sub-feature extraction unit with the plurality of sub-features of the plurality of types in the plurality of motion sequences stored in the motion database, wherein the motion-sequence determination unit calculates, for each type of the sub-feature(s) extracted by the sub-feature extraction unit, a degree of similarity between a sub-feature of a predetermined type and sub-features of the predetermined type in the plurality of motion sequences stored in the motion database to produce a plurality of calculated degrees of similarities, and wherein the motion-sequence determination unit determines one motion sequence based on the plurality of calculated degrees of similarities.

8. A method for determining a motion sequence of a virtual object in a virtual space, the method comprising:

extracting a sub-feature(s) of a predetermined type(s) from a plurality of features related to the virtual object;

determining one motion sequence from a motion database by comparing each of the sub-feature(s) of the predetermined type(s) with a plurality of sub-features of a plurality of types in a plurality of motion sequences stored in the motion database, wherein the motion database stores each of the plurality of motion sequences in association with the plurality of sub-features of the plurality of types, each of the plurality of sub-features of the plurality of types associated with a respective motion sequence among the plurality of motion sequences being a feature related to the respective motion sequence;

calculating, for each type of the sub-feature(s) that are extracted, a degree of similarity between a sub-feature of a predetermined type and sub-features of the predetermined type in the plurality of motion sequences stored in the motion database to produce a plurality of calculated degrees of similarities; and determining one motion sequence based on the plurality of calculated degrees of similarities.

9. A non-transitory computer readable medium storing a program causing a computer to execute the method according to claim 8.

* * * * *